United States Patent [19]

Barzantny et al.

[11] Patent Number: 4,668,170

[45] Date of Patent: May 26, 1987

[54] ELECTROMAGNETIC STIRRING PUMP FOR LIQUID METALS

[75] Inventors: Joachim Barzantny, Kürten-Eichhof; Theodor Lauhoff, Bergisch-Gladbach; Klaus Thissen, Cologne, all of Fed. Rep. of Germany

[73] Assignee: Interatom, Internationale Atomreaktorbau GmbH, Bergisch-Gladbach, Fed. Rep. of Germany

[21] Appl. No.: 701,565

[22] Filed: Feb. 14, 1985

[30] Foreign Application Priority Data

Mar. 16, 1984 [DE] Fed. Rep. of Germany ....... 3409773

[51] Int. Cl.[4] .............................................. H02N 4/20
[52] U.S. Cl. ..................................... 417/50; 266/234; 266/237; 310/11
[58] Field of Search ........................... 310/11; 417/50; 266/234, 237

[56] References Cited

U.S. PATENT DOCUMENTS

| 2,541,841 | 2/1951 | Tama | 417/50 X |
| 3,591,698 | 7/1971 | Howard | 266/234 X |
| 3,931,960 | 1/1976 | Bamji | 417/50 X |
| 4,166,714 | 9/1979 | Rienass et al. | 417/50 |
| 4,398,589 | 8/1983 | Eldred | 417/50 X |
| 4,449,890 | 5/1984 | Barzanthy et al. | 417/50 |

FOREIGN PATENT DOCUMENTS

| 54-154688 | 6/1981 | Japan | 417/50 |
| 624933 | 9/1978 | U.S.S.R. | 266/234 |
| 1041571 | 9/1983 | U.S.S.R. | 266/233 |

*Primary Examiner*—Carlton R. Croyle
*Assistant Examiner*—Theodore W. Olds
*Attorney, Agent, or Firm*—Herbert L. Lerner; Laurence A. Greenberg

[57] ABSTRACT

Electromagnetic pump for circulating and stirring liquid metal in a vessel. The pump is arranged in a liquid-metal-resistant immersion box. The pump has an approximately horizontal pump canal with the openings on two opposite sides of the liquid-metal-resistant immersion box. The pump can be immersed in the liquid metal bath by means of a suspension device. The pump canal has an elongated cross section and the longest dimension of the cross section is vertical. Comb-shaped magnet coil cores with magnet coils are arranged on both broad sides of the pump canal.

8 Claims, 3 Drawing Figures

ELECTROMAGNETIC STIRRING PUMP FOR LIQUID METALS

FIELD OF THE INVENTION

The present invention relates to an electromagnetic stirring pump for circulating and stirring liquid metal in a vessel, wherein the pump is arranged in a liquid-metal-resistant immersion box.

BACKGROUND OF THE INVENTION

Electromagnetic pumps for liquid metals are assuming increased importance because of their good controllability and their simple design. They have the advantage that no moving parts come into contact with the metal melt, thereby avoiding many problems. An induction immersion pump which is suitable for aluminum and other metals which melt at a relatively low temperature has been proposed in European Patent No. EP-A3 0 077 498. This immersion pump is intended for transporting liquid metal and in this form is not directly suited for circulating and stirring a melt.

Different induction pumps and circuits for their operation are further described in European Patent No. EP-B1 021 219. However, these pumps are not designed for circulating and stirring a melt, but are intended for heavy-duty conveyor operation. German Patent Application No. DE-02 21 18 894 has proposed the use of an electromagnetic immersion pump for circulating a melt. A suitable design, however, is not given.

SUMMARY OF THE INVENTION

The object of the present invention is to provide an electromagnetic stirring pump for liquid metals in a vessel, which is suitable for long-term use and with which replacement of parts subject to wear can be effected with little or no difficulty.

With the foregoing and other objects in view, there is provided in accordance with the invention an electromagnetic pump in an immersion box for circulating and stirring liquid metal in a vessel, which comprises:

(a) an electromagnetic pump having an approximately horizontal pump canal arranged in an immersion box which is resistant to liquid metal, with the openings of the pump canal on two opposite sides of the liquid-metal-resistant immersion box, (b) a suspension device for lowering the electromagnetic pump into a liquid metal bath contained in a vessel, (c) the pump canal having an elongated cross section in which the longest dimension of the cross section of the pump canal in the liquid metal bath is vertical, and (d) comb-shaped magnet coil cores with magnet coils arranged on both broad sides of the pump canal.

Other features which are considered as characteristic for the invention are set forth in the appended claims.

Although the invention is illustrated and described herein as embodied in an electromagnetic stirring pump for liquid metals, it is nevertheless not intended to be limited to the details shown, since various modifications may be made therein without departing from the spirit of the invention and within the scope and range of equivalents of the claims.

DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
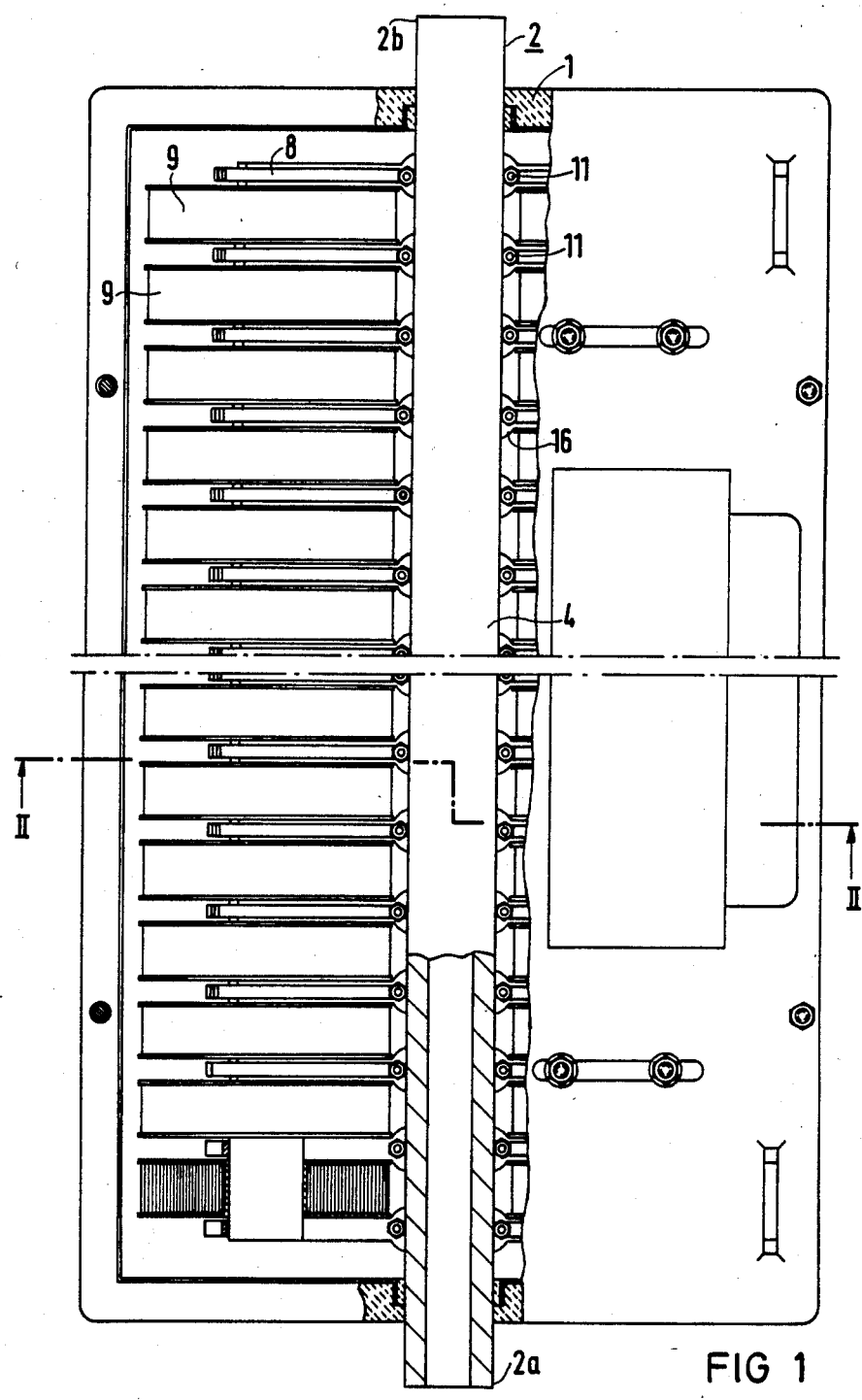
FIG. 1 is a cross-sectional view through a stirring pump according to the invention in the longitudinal direction of the pump canal.

According to the invention, the pump has an approximately horizontal pump canal, the openings of which are arranged on two opposite sides of an immersion box which is resistant to liquid metal and surrounds the pump. This horizontal arrangement has decisive advantages for the operation and maintenance of the pumps, as will be seen further in the following. The entire pump can be immersed in a liquid metal bath by means of a suspension device. The pump canal has an elongated cross section and is arranged so that the longest dimension of the cross section is vertical. Comb-shaped magnet coil cores with magnet coils which generate the traveling magnetic fields required for moving the liquid metal are arranged on the broad sides of the pump canal. The pump canal is formed preferably of one piece and has an elongated inside cross section. The preferred shape for the pump canal is that of a flattened tube. The horizontal arrangement of the pump canal together with the upright position with respect to the cross section turns out to be especially advantageous with respect to the circulating properties as well as the maintenance. The stirrer, according to the invention, has a capacity of, for instance, 120 tons of aluminum per hour.

In a further embodiment of the invention, the lid of the liquid-metal-resistant immersion box is designed as a support element fastened to the suspension, to which the parts of the pump as well as the remainder of the liquid-metal resistant immersion box are fastened thereto. The liquid-metal-resistant immersion box without the lid, together with the pump canal, forms a readily replaceable unit which can be fastened to the lid by fastening means. In this embodiment, the special advantages of the upright arrangement of the pump canal manifest themselves. Depending on the shape of the melting vessel, a stirring pump according to the invention need not be immersed very deep. The arrangement can therefore be designed so that the lid does not get below the liquid metal level. In this case, the lid need not consist of liquid-metal-resistant material. It can therefore be made of a load-supporting material, especially a metal. Due to the arrangement, according to the invention, of the coils and the pump canal it is possible, as will be explained in greater detail with reference to the embodiment example, to pull off the liquid-metal-resistant immersion box together with the pump canal downward from the rest of the apparatus by simply opening some fastening means. The pump canal between the magnet cores can then be pulled out without difficulty. Since in aggressive melts, even a liquid-metal-resistant immersion box has only a limited service life and also since the pump canal cannot be kept for an arbitrarily long time, the parts which come into contact with the liquid metal are parts subject to wear. In accordance with the invention, such parts are made readily interchangeable. The rest of the pump arrangement remains re-usable and normally does not require change.

In a special embodiment of the invention, for particularly aggressive liquid metals, the lid of the immersion box is made of metal, and the immersion box itself and the pump canal is fabricated of a liquid-metal-resistant material, preferably of a ceramic material.

In a further embodiment of the invention the comb-shaped magnet cores are provided between the teeth with induction coils wound about the back of the comb, with the leads of the induction coils running through the lid and the suspension to a supply and control section, i.e. supply of electric current and control of raising and lowering of the suspension. In present embodiments of induction pumps, the magnet coils were in most cases wound about the teeth or arranged between them. The proposed arrangement about the back of the comb makes it possible to accommodate a larger number of flat coils along a given length of the pump canal and thus makes possible a compact design of the stirring pump.

In another embodiment of the invention, the magnet cores consist of rectangular stacked laminations which are held together by means of a clamping device and are suspended from the lid. At least three kinds of rectangular magnet laminations are provided, one kind forming the back of the comb, around which the coils are wound; a second kind of magnetic laminations forming the teeth of the comb and a third kind of magnetic laminations enclosing the back and the teeth of the comb and holding it together by a clamping device. This embodiment, which will be explained in greater detail with reference to the embodiment example, makes possible a relatively easy assembly of the magnet cores and coils and still meets the specified requirements. The use of stacked magnet cores of mutually insulated laminations for preventing eddy currents is known per se. Since, especially in electromagnetic pumps immersed in a liquid-metal melt, the losses in the magnet cores and in the coils are to be kept as small as possible, special attention must be given to the layout of the magnetic circuits. The proposed solution meets these requirements with respect to production and operation.

The laminations forming the teeth of the comb-shaped magnet core are made somewhat wider at their ends facing the pump canal. This measure has a favorable effect on the shape of the magnetic field in the pump canal.

In a further embodiment of the invention, in the interest of ready replaceability of the parts subject to wear, the coils and magnet cores are fastened with their mountings adjustably at the lid. By opening the fastening, the coils with their magnet cores can then be pulled apart slightly, making it thereby easier to pull out the pump canal for replacement. In addition, when a new pump canal is inserted with a corresponding immersion box, a possible tolerance in production of the pump canal can be compensated, inasmuch as the coils can be adapted exactly to the position of the new pump canal.

Figure 2:
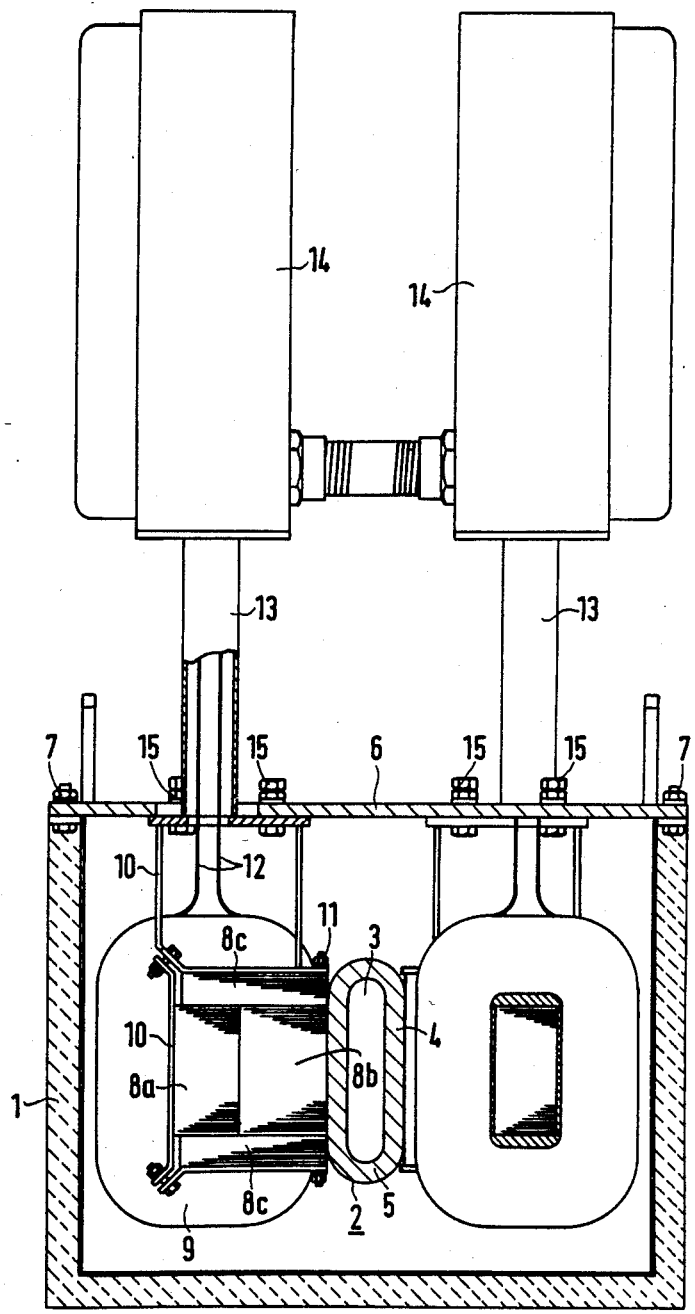
FIG. 2 is a section taken along line II—II in FIG. 1 perpendicular to the pump canal.
Figure 3:
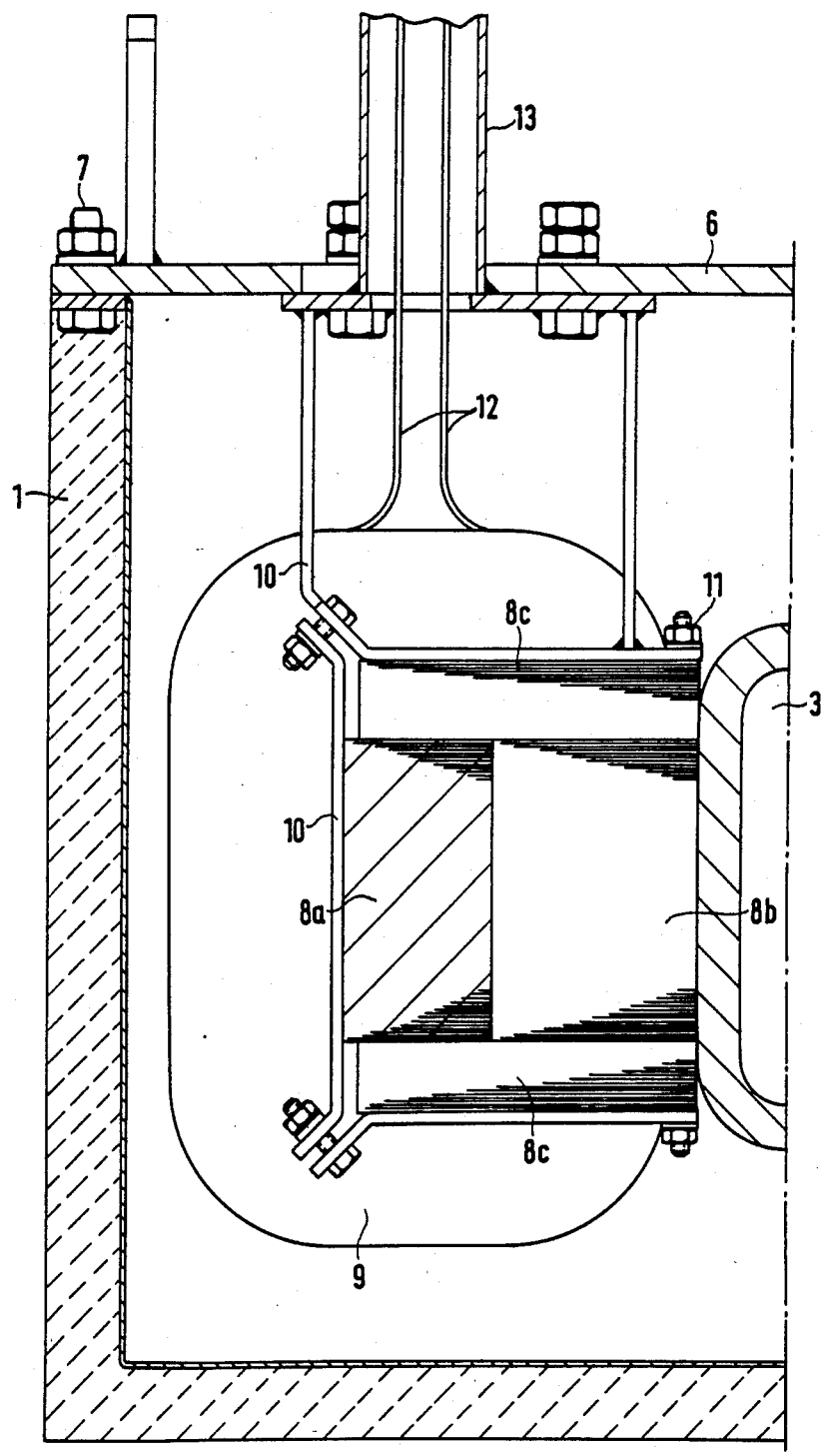
FIG. 3 is an enlarged detail of FIG. 2 a section with the comb-shaped magnet core.

An embodiment example of the invention is shown in the drawings. FIGS. 1, 2 and 3 show the parts of the electromagnetic stirring pump essential for the invention. A horizontally extending pump canal 2 is arranged in an immersion box 1 of liquid-metal-resistant material. The ends 2a, 2b of the pump canal 2 extend slightly beyond the walls of the immersion box 1 and are tightly connected thereto, preferably by a ceramic compound.

The pump canal itself has an elongated cross section, approximately corresponding to that of a largely flattened tube, the shape being essentially rounded. Relative to the cross section, the pump canal 2 is upright in the immersion box 1. The liquid metal is pumped through the inside cross section 3 of the pump canal by means of magnetic travelling fields, whereby the melt is agitated. Comb-shaped magnet cores 8a, 8b, 8c, about which coils 9 are wound, are arranged on the broad sides 4 of the pump canal 2. The coils are addressed by multiphase current, whereby, in a manner known per se, magnetic fields traveling in the longitudinal direction of the pump canal 2 are generated which set the electrically conductive melt in motion. In the embodiment example, the immersion box 1 need not be dipped into the melt to a depth to bring the lid 6 below the liquid metal level. The pump is immersed in the liquid metal to a depth insufficient to cause the lid 6 to come into contact with the liquid metal. Thereby, the lid 6 can consist of a material which is not resistant to the liquid metal, preferably of a metal because of the stability required. The lid 6 is designed here as a supporting element, from which the immersion box 1 is suspended by means of fastening screws 7, as well as the magnet cores 8a, 8b, 8c with their coils 9. The lid itself hangs from a suspension 13 which allows the entire device to be lowered or raised. The magnet cores 8a, 8b, 8c and the coils 9 are held together by a clamping device 10 and fastened to the lid 6. The fastening 15 to the lid 6 is designed so that the magnet cores 8a, 8b, 8c and the coils 9 can be pushed away slightly from the pump canal 2 after the fastening screws 15 are loosened. In this manner, an easier replacement of the pump canal 2 and the immersion box 1 is made possible. The electric leads 12 of the coils run preferably through the lid 6 and the suspension device 13 upward to a supply and control unit 14.

In principle, there are many possibilities for the detailed embodiment of the magnet cores and the coils. An embodiment advantageous with respect to production and the magnetic properties is shown in FIG. 3. Accordingly, the comb-like magnet cores consist of at least three different, basically rectangular kinds of mutually insulated laminations of ferromagnetic material. One kind 8a of the magnetic laminations forms the back of the comb and extends through the interior of the coils 9. Another kind 8b of magnetic laminations forms the teeth of the comb and a third kind 8c surrounds the back and the teeth of the comb. Through interaction of the mounting elements 10 with the outer magnetic laminations 8c, a stable design of the magnet core is obtained. It is particularly advantageous if the ends 16 of the magnetic laminations 8b and 8c which point toward the pump canal 2, are provided with a hole, through which a holding screw 11 is brought. This measure ensures that the magnetic laminations extend uniformly along the pump canal 2. The ends 16 of the magnetic laminations 8b and 8c can be made wider to favorably influence the magnetic field patterns.

The stirring pump according to the invention is particularly well suited for aluminum melts and other metals with a comparable melting point.

The foregoing is a description corresponding, in substance, to German application No. P 34 09 773.2, dated Mar. 16, 1984, international priority of which is being claimed for the instant application, and which is hereby made part of this application. Any material discrepancies between the foregoing specification and the specification of the aforementioned corresponding German application are to be resolved in favor of the latter.

There is claimed:

1. Electromagnetic pump in an immersion box for circulating and stirring liquid metal in a vessel, which comprises:
   (a) an electromagnetic pump having an approximately horizontal pump canal arranged in an immersion box which is resistant to liquid metal, with the openings of the pump canal on two opposite sides of the liquid-metal-resistant immersion box,
   (b) a suspension device for lowering the eletromagnetic pump into a liquid metal bath contained in a vessel,
   (c) the pumb canal having an elongated cross section in which the longest dimension of the cross section of the pump canal in the liquid metal bath is vertical, and
   (d) comb-shaped magnet coil cores with magnet coil which generate traveling magnetic fields required for moving the liquid metal are arranged on both broad sides of the pump canal.

2. Electromagnetic pump according to claim 1, wherein
   (a) a lid for the top of the liquid-metal-resistant immersion box is also a supporting element fastened to the suspension, fastened to the comb-shaped magnet coil cores with magnet coils, and fastened to the liquid-metal-resistant immersion box, and
   (b) the liquid-metal-resistant immersion box without the lid together with the pump canal forms a readily interchangeable part, which can be fastened to the lid by fastening means.

3. Electromagnetic pump according to claim 2, wherein
   (a) the lid of the liquid-metal-resistant immersion box is a metal lid, and
   (b) the immersion box without the lid and the pump canal are made of a liquid-metal-resistant material.

4. Electromagnetic pump according to claim 3, wherein the liquid-metal-resistant material is ceramic material.

5. Electromagnetic pump according to claim 2, wherein
   (a) the comb-shaped magnet cores are provided between the teeth with induction coils which are wound about the back of the comb, and
   (b) leads of the induction coils run through the lid and the suspension to a supply and control unit.

6. Electromagnetic pump according to claim 2, wherein
   (a) the magnet cores are rectangular stacked laminations which are held together by means of a clamping device and are suspended at the lid, and
   (b) at least three kinds of rectangular magnetic laminations are provided, of which one kind forms the back of the comb, about which the coils are wound, a second kind of magnetic laminations forms the teeth of the comb, and a third kind of magnetic laminations encloses the back and the teeth of the comb and holds them together jointly with the clamping device.

7. Electromagnetic pump according to claim 6, wherein the laminations forming the teeth of the comb-shaped magnet core are widened somewhat at their end facing the pump canal.

8. Electromagnetic pump according to claim 2, wherein the coils and magnet cores are fastened with their mounting movably to the lid.

* * * * *